(12) United States Patent
Entienne et al.

(10) Patent No.: US 8,950,883 B2
(45) Date of Patent: Feb. 10, 2015

(54) BEZEL-FREE DISPLAY DEVICE USING DIRECTIONAL BACKLIGHTING

(71) Applicant: Corning Incorporated, Corning, NY (US)

(72) Inventors: Michael Entienne, Corning, NY (US); Jacques Gollier, Painted Post, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 56 days.

(21) Appl. No.: 13/787,194

(22) Filed: Mar. 6, 2013

(65) Prior Publication Data
US 2013/0235561 A1 Sep. 12, 2013

Related U.S. Application Data

(60) Provisional application No. 61/608,960, filed on Mar. 9, 2012.

(51) Int. Cl.
*G09F 13/04* (2006.01)
*F21V 5/00* (2006.01)
*G02F 1/1333* (2006.01)
*G02F 1/1335* (2006.01)

(52) U.S. Cl.
CPC ............ *F21V 5/00* (2013.01); *G02F 1/133308* (2013.01); *G02F 1/133526* (2013.01); *G02F 1/13336* (2013.01); *G02F 2001/13332* (2013.01); *G02F 2001/133331* (2013.01)
USPC ......................................... 362/97.2; 362/97.1

(58) Field of Classification Search
USPC ................................................ 362/97.1–97.4
See application file for complete search history.

(56) References Cited

U.S. PATENT DOCUMENTS

| | | | |
|---|---|---|---|
| 6,700,702 B2 | 3/2004 | Sales | 359/443 |
| 2006/0291239 A1* | 12/2006 | Hasei et al. | 362/600 |
| 2007/0206148 A1 | 9/2007 | Hara et al. | |
| 2008/0158796 A1 | 7/2008 | Hine | 361/681 |
| 2009/0011197 A1* | 1/2009 | Matsuhira | 428/192 |
| 2009/0310060 A1* | 12/2009 | Sudo et al. | 349/58 |
| 2009/0322794 A1* | 12/2009 | Lowe et al. | 345/690 |

(Continued)

FOREIGN PATENT DOCUMENTS

| | | |
|---|---|---|
| GB | 2432961 A | 6/2007 |
| WO | WO 2013/055852 A1 | 4/2013 |
| WO | WO 2013/055853 A1 | 4/2013 |

OTHER PUBLICATIONS

PCT/US2013/029757—Invitation to pay additional fees—PCT form ISA 206—May 31, 2013.
K. Käläntär, Distinguished Paper: Directional Backlight and Narrow Angular Luminance Distribution for Viewing Angle of a LCD with a Front-Surface-Light-Scattering Film, *SID 11 Digest*, pp. 890-893.

(Continued)

*Primary Examiner* — Evan Dzierzynski
(74) *Attorney, Agent, or Firm* — Kevin M. Able

(57) ABSTRACT

A display device comprising a display panel, a diffusing member positioned between the display panel and an observer, and a directional backlight wherein the directional backlight comprises a half angle divergence equal to or less than 15°. The display cover is preferably configured to shift an image displayed on the display panel relative to an observer to obscure a bezel surrounding the display panel. The use of a directional backlight and a diffusing display cover plate allows for a very small gap between the display panel and the display cover plate.

18 Claims, 10 Drawing Sheets

(56) References Cited

U.S. PATENT DOCUMENTS

2010/0315819 A1* 12/2010 Hirata et al. ............. 362/296.08
2012/0027399 A1  2/2012 Yeates

OTHER PUBLICATIONS

T. Saruta, et al., A wide-viewing-angle liquid-crystal display using front-scattering film and directional backlight, *Proc. of SPIE*, vol. 7955, pp. 79550G-1-79550G-9.

\* cited by examiner

BEZEL-FREE DISPLAY DEVICE USING DIRECTIONAL BACKLIGHTING

This application claims the benefit of priority under 35 U.S.C. §119 of U.S. Provisional Application Ser. No. 61/608,960 filed on Mar. 9, 2012 the content of which is relied upon and incorporated herein by reference in its entirety.

TECHNICAL FIELD

The present disclosure relates to bezel-free displays, and in particular to bezel free liquid crystal displays that incorporate a directional backlight.

BACKGROUND

As used herein, the term display device is intended to encompass all devices capable of displaying visual content, including but not limited to computers, including laptops, notebooks, tablets and desktops; mobile telephones, and; televisions (TV). Each of the foregoing devices includes many component parts including the physical case or cabinet in which individual components may reside, circuit boards, circuit elements such as integrated electronic components, and of course the display panel itself. Currently, these display panels are flat display panels comprising liquid crystal display elements, organic light emitting diode (OLED) display elements, or plasma display elements, and of course the glass or plastic substrates on which many of these elements are disposed and/or enclosed by. Typically, the edge portions of the flat display panels and the display device itself are utilized for electrical leads and various other electronic components associated with the operation of the display panel, such as circuits that drive the panel pixels as well as LED illuminators in the case of an LCD display panel. This has resulted in flat display panel manufacturers encasing the edge portions within and/or behind a bezel, which bezel serves to conceal the foregoing components, but also obscures the edge portions of the display panel thereby reducing the overall image size.

For esthetic reasons, flat panel display makers are trying to maximize the image viewing area and provide a more aesthetically pleasing appearance, and accordingly minimize the size of the bezel surrounding the image. However, there are practical limits to this minimization, and current bezel sizes are in the order of 3 mm to 10 mm in width. Therefore, to achieve the ultimate goal of no bezel at all, an optical solution has been proposed that will give the observer the impression that the image is occupying the entire panel surface while simultaneously reducing an air gap between the image-forming display panel and a display cover plate.

SUMMARY

According to embodiments described herein, a bezel-free appearance is provided to a display device by employing, for example, a diffusing member and a directional backlight.

In one example embodiment a display device is disclosed comprising a directional backlight; a diffusing member; a display panel positioned between the directional backlight and the diffusing member, the display panel configured to display an image; a bezel disposed about the display panel; an image expander configured to expand the display panel image and conceal the bezel; and wherein a half angle divergence of the light emitted by the directional backlight does not exceed 15° relative to a normal to a plane of the display panel. The display panel in the case of an LCD display panel includes, for example, a first substrate, a second substrate sealed to the first substrate, and wherein an LCD material is positioned between the first and second substrates. The substrates are typically formed from glass. The display panel may further comprise various thin film materials deposited on one or both of the substrates, including without limitation thin film transistors, polarizing films, color filter films, transparent conductive films such as ITO (indium tin oxide), antireflection films, spacer elements, alignment films.

The diffusing member may comprise, for example, a display cover plate positioned between the display panel and an observer of an image formed by the display panel. The diffusing member may include diffusing particles distributed within a substrate, such as within a body of the substrate, below a surface thereof. A mean particle size of the diffusing particles in some examples is between 100 nm and 300 nm. In other examples the mean particle size of the diffusing particles is in a range from about 150 nm to about 250 nm. In some examples the display cover plate comprises glass. The glass can be a chemically strengthened glass such as an ion-exchanged glass. The display cover plate may comprise a light absorbing layer comprising an array of transparent regions. The directional backlight may comprise a diffusing screen, wherein the diffusing screen does not extend opposite edge portions of the display panel. A splitting film can be positioned over the edge portions of the display panel

BRIEF DESCRIPTION OF THE DRAWINGS

These and other aspects are better understood when the following detailed description is read with reference to the accompanying drawings, in which.

DETAILED DESCRIPTION

Figure 1A:
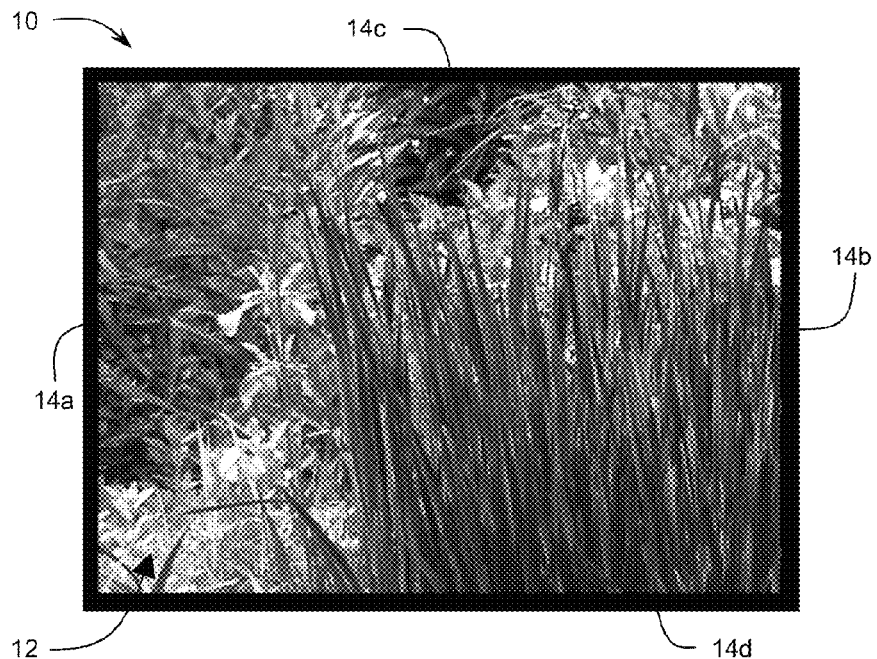
FIG. 1A is a front view of a display device comprising a display panel and a bezel.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

The aesthetics of display devices, such as television display panels, computer monitors, and laptop display panels, are affected by the size and appearance of a bezel that exists around a perimeter of such display devices. The bezel of a display device may be used, for example, to house electronics for driving the pixels of the display panel, as well as, in certain instances, to provide backlighting for the display device. For example, an LCD television display panel may include a plurality of backlighting light emitting diodes (LEDs) maintained within the bezel region of the display device.

The trend over the last few years has been toward smaller and smaller bezels. Current bezel widths are in the order of 3 to 10 mm. However, television models having very large display panels have achieved bezel regions having a width as small as 2 mm on at least two borders and 4 mm on the other two borders. However, the presence of a bezel, even though small, is still distracting, especially when the display devices are assembled in a tiled arrangement to form a very large displayed image. The bezels of such tiled display devices give the undesirable appearance of an image "grid," rather than a cohesive large image without seams. The eye is very sensitive to the presence of a black line separating tiled display devices, which makes such an image unsightly.

Embodiments of the present disclosure include bezel-concealing display cover plates that conceal the bezel so that its presence is not visible, or at the least not noticeable to the observer within a predictable viewing angle. Such display cover plates can be formed from glass, for example. In some embodiments the glass can be a chemically strengthened glass.

Figure 1B:
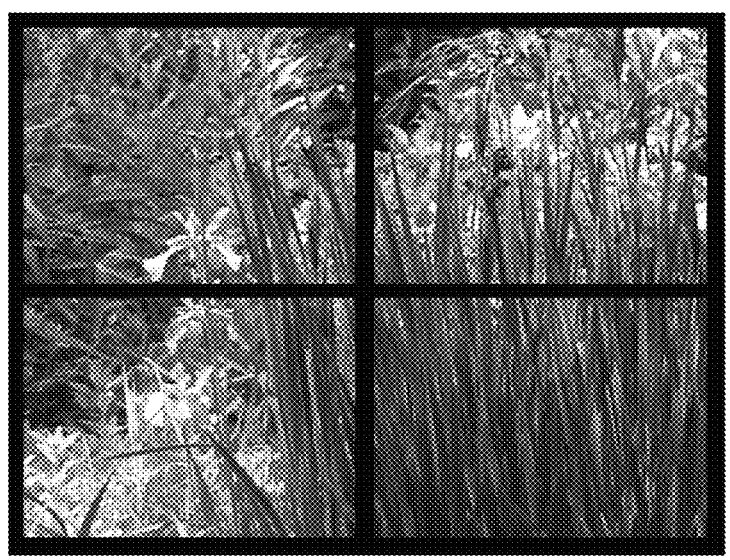
FIG. 1B is a front view of a tiled array of display devices.

Referring now to FIG. 1A, a display device 10 configured as a flat display panel television is illustrated. While the following description is primarily in terms of televisions, it should be noted that embodiments described herein may be suitable for other display devices and therefore the described embodiments are not limited to televisions. Display device 10 comprises a display panel 12 that has a bezel 14 positioned around its perimeter. Bezel 14 comprises bezel portions 14a-14d. The bezel portions 14a-14d may enclose display drive electronics, as well as backlighting hardware to backlight the display panel 12, such as edge light emitting diodes (LEDs). The bezel portions 14a-14d may have a particular width, such as between 3 mm and 10 mm, for example. The bezel portions 14a-14d may be distracting to a viewer, particularly if several display devices are arranged in a matrix in order to view the entire image, as illustrated in FIG. 1B.

Figure 2:
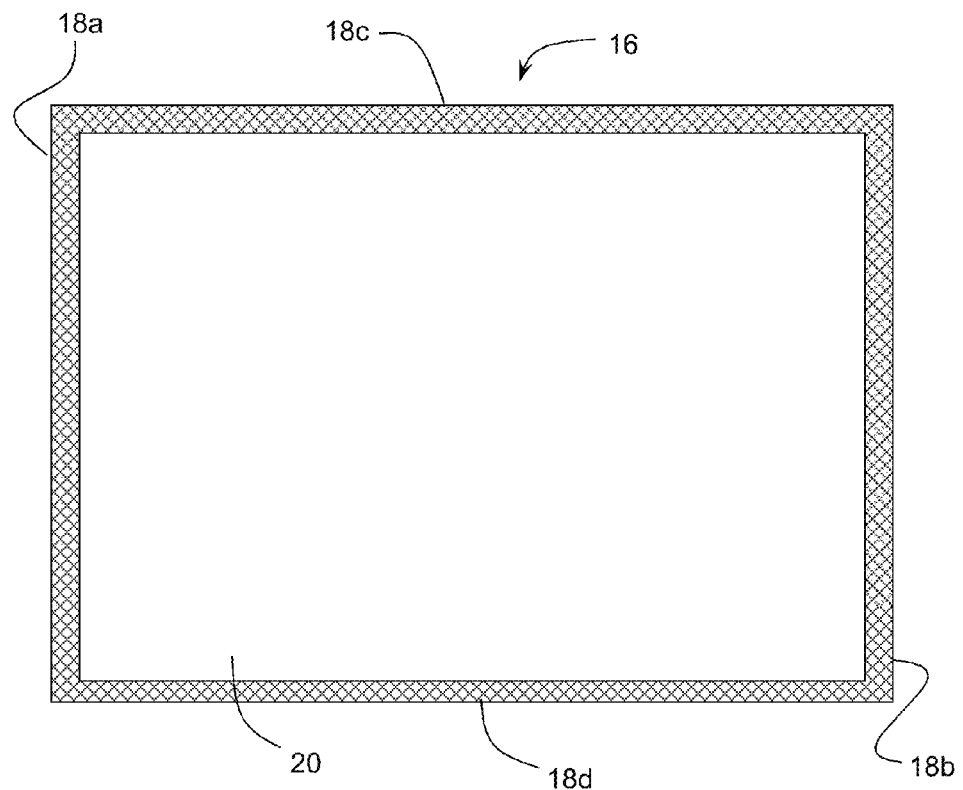
FIG. 2 is a front view of a display cover including prism regions for concealing a bezel.

One way to achieve such a bezel-concealing characteristic consists of putting magnifying optics such as a Fresnel lens at a predetermined distance from the display panel such as shown in FIG. 2. A Fresnel lens comprises optical structures such as micro prisms. The lens structure may be, for example, in a plastic film that is attached to display cover plate 16. To minimize the air gap distance between the display panel and the lens (e.g. display cover plate), the prisms are required to introduce a very high beam deflection. However, at very steep angles of beam incidence on the prisms total internal reflection may occur at the prism surface. To avoid this, the deflection angle introduced by the prisms should be limited. This leads to a requirement for a very large air gap (typically 4 to 5 times the width of the bezel). The magnitude of the air gap can be reduced to less than about 4 times the bezel width, however, by using a backlight that is directional and a diffuse surface on the display cover plate.

Bezel-concealing display cover plate 16 may, for example, comprise a prism region including four prism portions 18a-18d adjacent to the perimeter of the display cover plate. As described in more detail below, prism portions 18a-18d comprise many prisms arranged in an array that act as a light bending (refracting) filter to the regions of the display panel 12 that are positioned behind the bezel portions 14a-14d relative to the observer. The display cover plate and the light bending filters provided by the prism portions 18a-18d make it possible to conceal the bezel so that its presence is not visible, or at least not readily apparent to the observer within a predictable viewing angle. The bezel-concealing display cover plate 16 may further comprise a visually transparent central portion 20 bounded by the prism portions 18a-18d that does not contain any prisms and is therefore substantially flat. The bezel-concealing display cover plate 16 may be made of glass. For example, the glass may be a chemically strengthened glass such as an ion exchanged glass, an acid-washed glass, or both. Prism portions 18a-18d may, for example, be made from a commercially available light bending filter material that can be adhered to the display cover plate, such as Vikuiti image directing film (IDF II) manufactured by the 3M Company. It should be understood that Vikuiti is but one of many possible light bending filter solutions, and is presented herein as a non-limiting example only. In another example, light bending filters may be incorporated directly into display cover plate 16. For example, prisms may be formed directly in the display cover plate material. As described in more detail below, specialized light bending filters may be optimized and developed for the purpose of concealing the bezel from an observer. It is noted that an air gap of approximately 2.7 times the desired lateral image shift is needed when using the Vikuiti light bending filter.

Figure 3A:
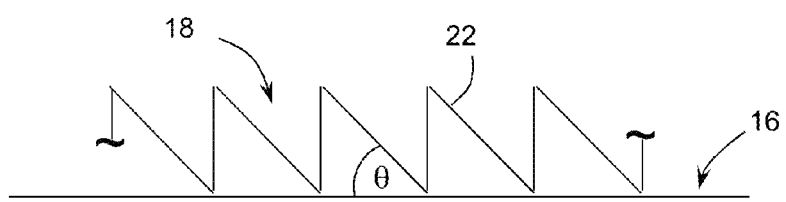
FIG. 3A is a schematic diagram of a portion of a prism region positioned on an outside surface of display cover plate 16 (facing an observer) showing individual prisms.
Figure 3B:
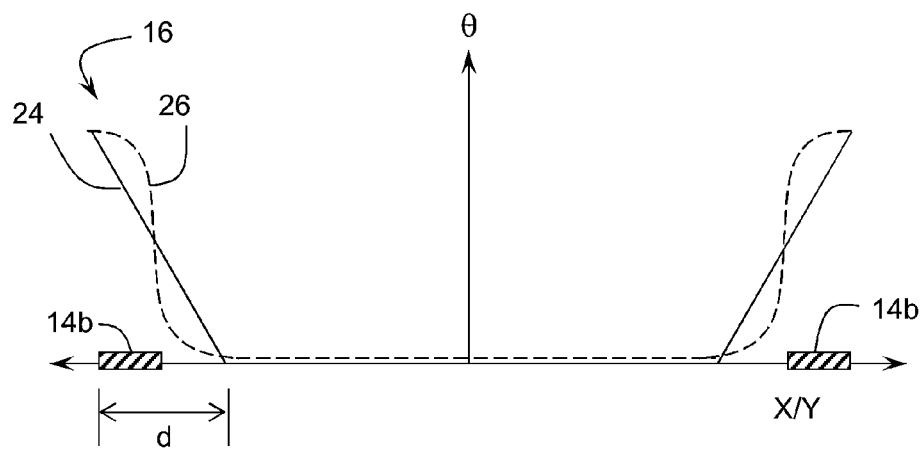
FIG. 3B is a graph showing the prism angle θ as a function of position on a display device.

Referring now to FIG. 3A, a portion of a prism region 18 positioned of a bezel-concealing display cover plate 16 is illustrated. The prism portion comprises many prisms 22 that are triangularly shaped. The prisms 22 are positioned on an outside surface of the display cover plate 16 (facing an observer) in the figure. The prisms 22 include a prism angle θ that cause the image near the bezel to be shifted, wherein the prism angle is the angle bounded by the faces (facets) of the prism through which light predominantly transits the prism. FIG. 3B is a graph showing the prism angle θ as a function of position on the display device 10. Generally, the angle θ of the prisms 22 should be at a maximum at the edge of the bezel-concealing display cover plate 16 and fall to zero (i.e., no prisms at all) away from the edges of the display cover plate. Accordingly, only a small portion of the image produced by display panel 12 will be shifted. The frequency of the prism array, that is the periodicity of the prisms, should be greater than the frequency of the pixels of the display panel to prevent aliasing in the resulting image. Generally, the prisms should be sized smaller than the pixels. For example, the individual prisms may be as small as 1/10 the size of a single pixel.

Solid curve 24 depicts an example in which the angle θ of the prisms decreases linearly from the edges of the bezel-concealing display cover plate 16 and falls to zero at the central region over a distance d. Dashed curve 26 depicts an example in which the prism angle θ of the prisms vary non-linearly over distance d. The more complicated profile of dashed curve 26 may be considered with the aim of avoiding disturbing image discontinuities.

Figure 4:
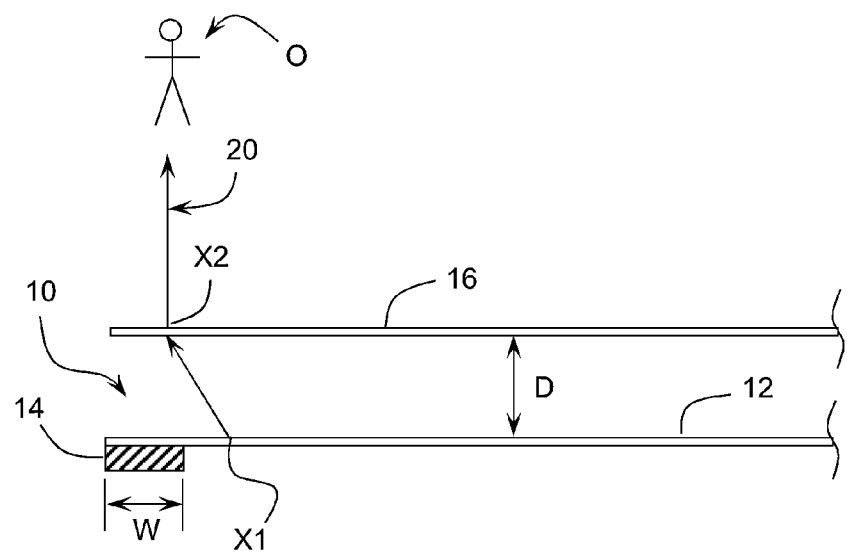
FIG. 4 schematically illustrates an observer located far away from a display panel of a display device that is covered with a bezel-concealing display cover.

FIG. 4 schematically illustrates an observer O located far away from a display panel 12 of a display device 10 wherein a bezel-concealing display cover plate 16 is positioned between the display panel and the observer. An air gap D exists between the bezel-concealing display cover plate 16 and the display panel 12. The simulation traces light rays emitted from the display panel 12 to the observer O and indicates, for a given position X1 on the display panel 12, the position X2 where the light ray hits the bezel-concealing display cover plate 16. In one simulation, the prisms face the observer O, and the prism angle of the prisms vary linearly from 32° at the very edge of the bezel-concealing display cover plate 16 (i.e., above a portion of bezel 14) to 0° about 10 mm away from the outer edge of display cover plate 16. The index of refraction of the bezel-concealing display cover plate 16 in the simulation was 1.5, and the air gap D was about 15 mm.

Figure 5:
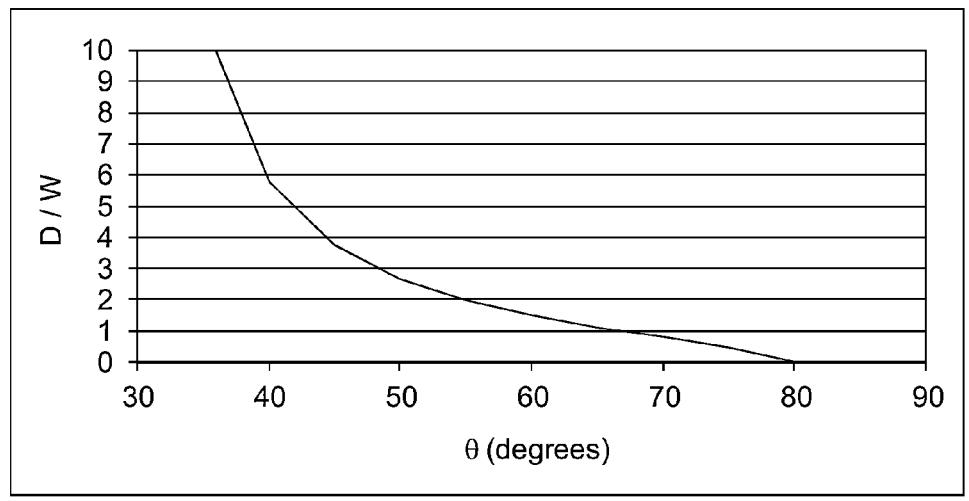
FIG. 5 is a plot of the ratio of air gap distance D to bezel width W as a function of prism angle θ.

The amount of beam deviation that can be produced by a prism is a function of the angle θ of the prism. The graph depicted in FIG. 5 shows the ratio of air gap D to bezel width W as a function of prism angle θ assuming a refractive index of 1.5 and further assuming the bezel is to remain essentially invisible for a viewing angle of about 20 degrees. As an example, by using a prism angle θ of about 45 degrees, the air gap needs to be at least 4 times the width of the bezel (a ratio of 4).

It should be noted that the localized light bending filters provided by the preceding examples of a bezel-concealing display cover plate 16 near the bezel of a display device such as display device 10 may produce image distortion. Such image distortion may be mitigated, for example, by modifying the pixel position in the display device to compensate for the optical distortion introduced by the prisms. Where the prism angle variation is a linear function, it can be shown that the image distortion causes local magnification of the image, which can then be compensated by using a smaller pixel pitch at the edges of the display device.

When the observer does not view the display device 10 at normal incidence, bezel 14 may be partly or wholly visible. In particular, when the observer O is located very close to the display device 10, the observer will view all of the edges of the display cover plate at high angles of incidence, which may make all of the bezel portions visible and may give an impression, for example, of a television inside a box.

A reduction in the visibility of the bezel at an increased viewing angle may be accomplished by adding a diffusing texture on the prism portions 18a-18d of the bezel-concealing display cover plate 16. The image may be partially blurred in this region close to the bezel portions 14a-14d because that part of the image is generated on the bezel-concealing display cover plate 16. However, having a 10 mm blurred area for a large television may not be a significant visual distraction because observers usually fix their attention near the center of the image, and peripheral information is not as significant. In some examples, prism portions 18a-18d may have prisms on each side of the bezel-concealing display cover plate 16 to enlarge the viewing angle.

Figure 6:
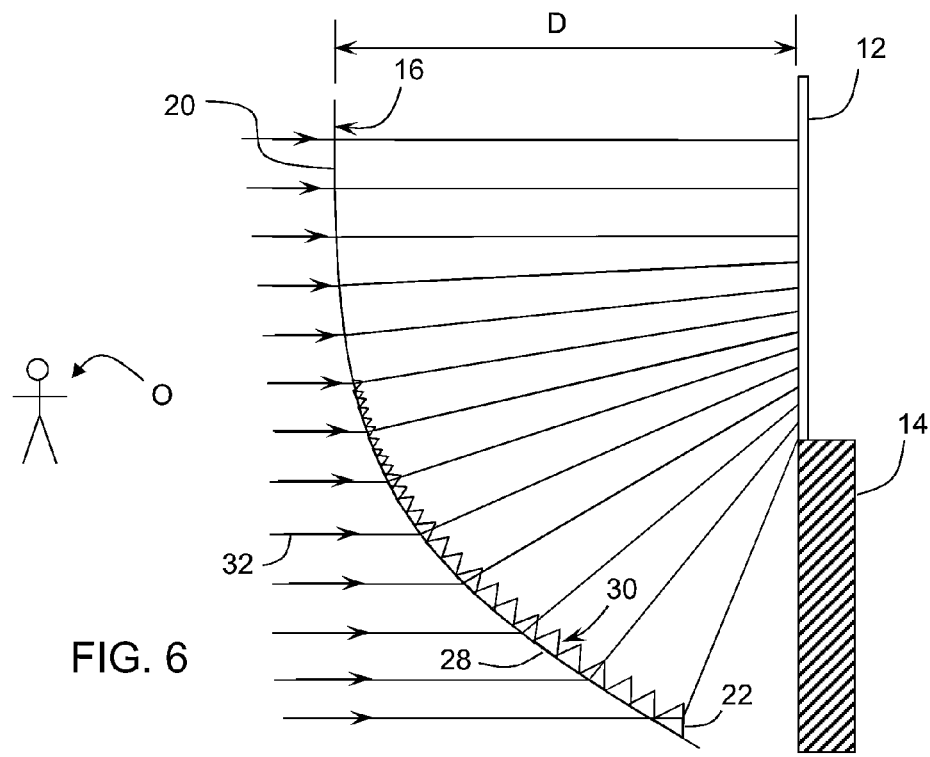
FIG. 6 is a cross sectional view of an edge portion of a display cover plate comprising an array of prisms positioned in front of a bezel and a display panel, relative to an observer of the display panel showing the view of the display panel seen by the observer.

Referring now to FIG. 6, an edge portion of a bezel-concealing display cover plate 16 having a curved portion 28 in close proximity to an edge of the display device 10 and over bezel 14 is illustrated. Curved portion 28 comprises prisms 22. The shape of the curved portion 28 of the bezel-concealing display cover plate 16 is optimized to conceal bezel 14 over a wider vision angle. Prisms 22 may be formed directly on display cover plate 16, or on a film attached to display cover plate 16, or other processes may be employed to achieve small prism structures on the display cover plate 16. This may produce an image that is visually bezel-free at a very large viewing angle, for example 45° as a non-limiting example.

In the embodiment depicted in FIG. 6, a portion of a bezel-concealing display cover plate 16 is shown including a light bending filter 30 comprising a plurality of prisms 22 that face display panel 12. The display cover plate 16 has a first straight central portion 20 at a distance from display panel 12 that provides an air gap D between display cover plate 16 and display panel 12 of the display device 10. Display cover plate 16 further comprises a curved portion 28 that connects with central portion 20. Lines 32 depict observer O's view of the image formed by display panel 12, and show how the image is stretched (e.g. shifted) over bezel 14.

Figure 7:
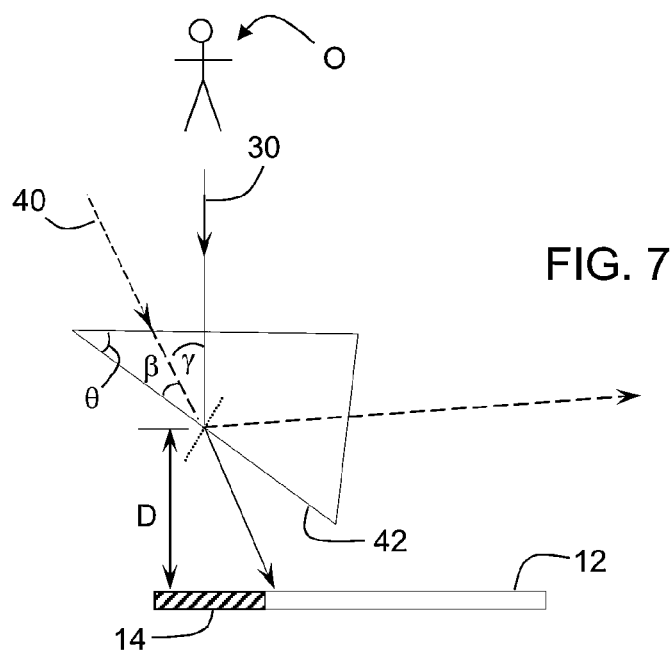
FIG. 7 is a cross sectional view of a portion of the display panel and a bezel, and a single prism of the array of prisms of FIG. 6.

Referring now to FIG. 7 showing a single prism of the light bending filter of FIG. 6, where prisms 22 face display panel 12, when observing the image at relatively large negative angles γ along dashed line 40 relative to the zero-degree viewing position denoted by reference numeral 30, the angle β relative to the prism-atmospheric interface of facet 42 of an individual prism becomes very small. As angle β continues to decrease, angle β will reach the total internal reflection angle meaning the observer no longer observes the image from display panel 12. For example, by fixing the defect free image viewing angle γ to −60 degrees, the maximum prism angle θ is about 6.5 degrees to avoid the total internal reflection regime. In this case, air gap D needs to be approximately 18 times larger than the bezel width to eliminate viewing the bezel at normal incidence.

One way to account for total internal reflection, as well as for increasing the viewing angle range, is to optimize the angle variation profile of the prisms. Using curved glass can minimize air gap distance D, but modeling has shown that a typical minimum air gap is still approximately 5 times the bezel width to obtain a large viewing angle that remains free of distracting visual artifacts.

Figure 8:
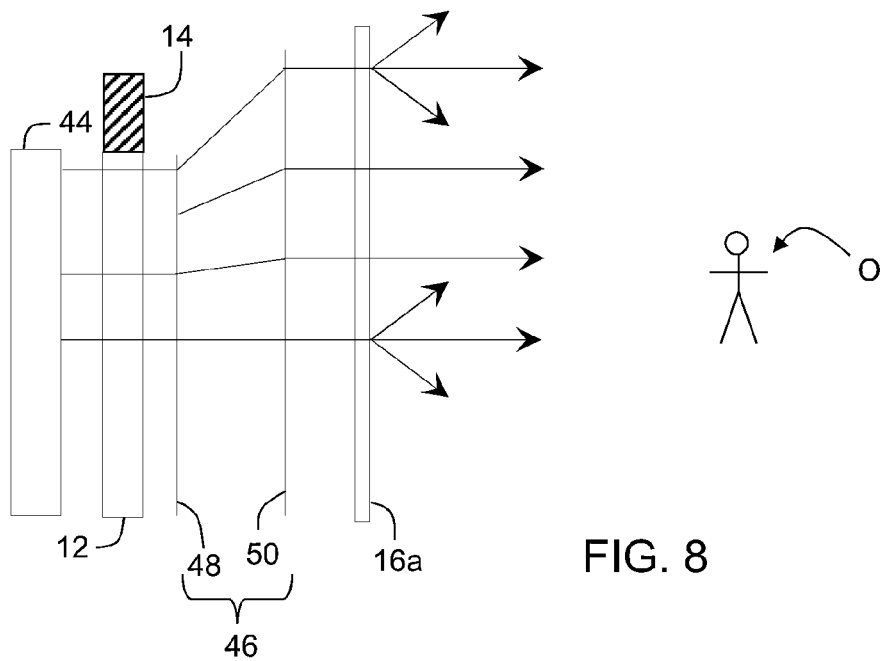
FIG. 8 is a cross sectional view of a display device comprising a diffusing member positioned between the display panel and an observer.

A fundamental limitation of the preceding approaches is the need for a large deflection but a need also for the prisms to work for a very wide viewing angle. Consider next a display panel as shown in FIG. 8 wherein light emitted by backlight 44, and which light traverses display panel 12 to observer O, is passed through an image enlarging device 46, such as diverging and converging Fresnel lens arrays 48, 50, respectively, for example. In this case, when prisms 22 are inserted into the optical path the prisms are effective for one specific viewing angle. Therefore, the system is optimized at that angle and large deflections can be achieved without the prisms producing total internal reflection of the light incident at the air gap-prism interface. However, since light emitting from display panel 12 is transmitted in only one preferential direction, the image can only be clearly seen by an observer O at one viewing angle. Therefore, diffusing member 16a may be positioned between image enlarging device 46 and observer O to broaden the viewing angle. Diffusing member 16a can be, for example, a display cover plate 16 configured to diffuse light.

Since diffusing member 16a is introduced at some predetermined distance from the pixels of display panel 12, the image may be subject to blurring. The amplitude of that blurring can be determined to a first approximation by the following equation, $$B = 2D \tan(\psi), \quad (1)$$

where B is the blurring amplitude, D is the air gap distance from the display panel to the diffusing member and $\psi$ is the half angle divergence of the light emitted by backlight 44 relative to a normal to a plane of display panel 12. To minimize the amplitude of blurring, a backlight with a high degree of directionality is needed, i.e. a small half angle divergence. Additionally, air gap distance D should be minimized by having a large beam deflection near the edge of the display panel. As used herein, a directional backlight is a backlight wherein light emitted by the backlight has a half angle divergence equal to or less than about 15° relative to a normal to a plane of the display panel with which it is used. In some examples the half angle divergence can be equal to or less than 10°. In other examples, the half angle divergence can be less than 5°.

In some embodiments air gap D between display panel 12 and the diffusing member 16a occurs only at the edge of display device 10 where the bending optical elements are positioned to magnify the image. In this case, diffusing member 16a is in close proximity to display panel 12 over most of the display panel surface, and image blurring only appears at the very edge of the image.

Figure 9:
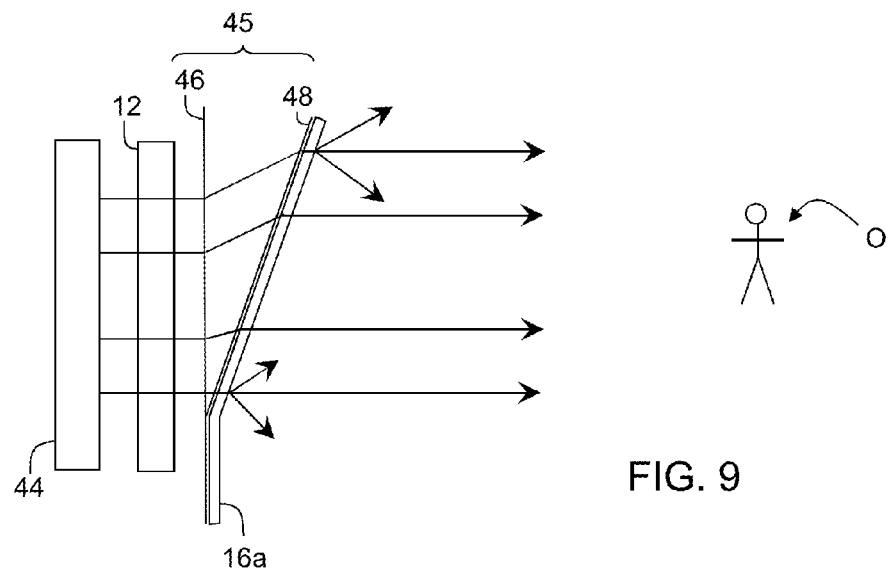
FIG. 9 is a close up view of a portion of an edge portion of a display device comprising a diffusing member positioned between the display panel and an observer.

In another embodiment backlight 44 need only be directional near the edge of display panel 12. Accordingly, a diffusing member 16a may be provided that affects only the edge portions of the transmitted image as illustrated in FIG. 9. FIG. 9 illustrates a region of the display device near an edge of the display device, and where a diffusing member that projects away from display panel 12 near edges of the display panel. In this instance, the remainder of the image transmission process does not require either a directional backlight or a diffusing member.

When a conventional diffusing member is positioned between display panel 12 and observer O image contrast may be affected due to haze. Accordingly, bulk scattering elements (i.e. particles contained within a body of the diffusing member) as opposed to scattering materials deployed at a surface of the diffusing member may be employed (see FIG. 15) to reduce image blurring.

Figure 10:
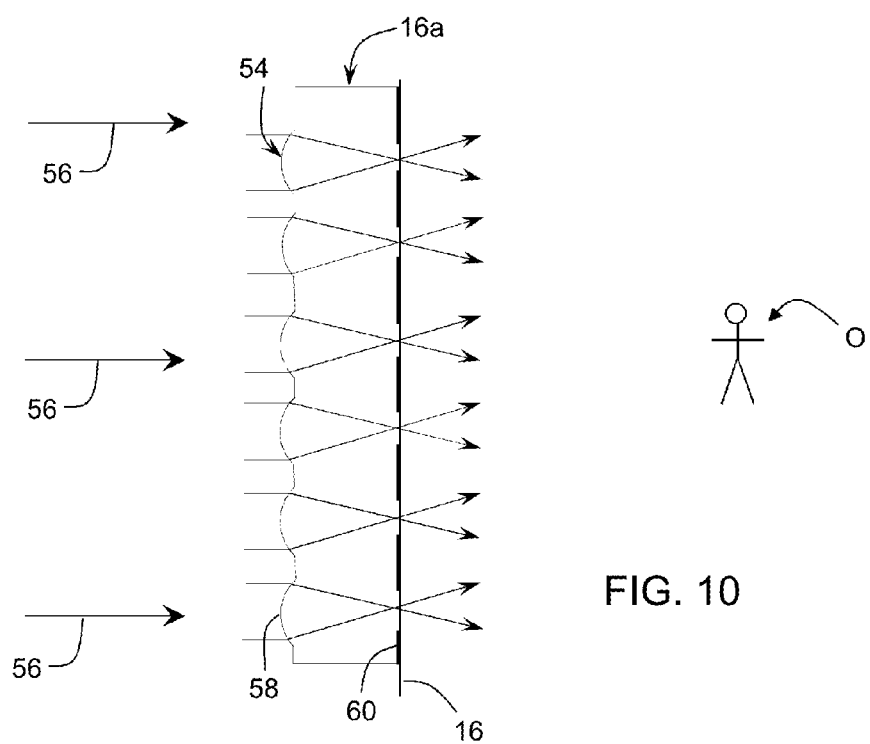
FIG. 10 is a cross sectional view of a portion of a diffusing member positioned between a display panel and an observer, wherein the diffusing member comprising a lens array and a substrate comprising an absorbing layer including apertures that allow the transmission of light therethrough.

In another example, display device 10 as illustrated in FIG. 10 is provided with a diffusing member 16a in the form of an array 54 of microlenses 58 that are preferably both random and generally anamorphic, a substrate (e.g. display cover plate 16), and a layer of light absorbing material 60. The layer of light absorbing material 60, for example, may be formed on a backside of the diffusing member facing display panel 12.

The following process can be used to form the diffusing member. In a first step, the microlens array, the substrate, and the layer of light-absorbing material may be integrated in a single sheet (the microlens array and the substrate can constitute a single unit if desired). In a second step, the substrate is exposed to aperture-forming illumination, e.g., ultraviolet light, through the microlens array itself to create apertures in the light-absorbing material. There is no need to use external alignment masks and the initial self-alignment provides that light is efficiently transmitted through the apertures. The microlens array may be designed such that the apertures created by the aperture-forming illumination do not block any portion of the useful luminous energy from backlight 44. At the same time, microlens array 54 can be designed to maximize the density of light-absorbing material remaining after the creation of the apertures. By apertures what is meant is either physical apertures (holes) or a transparent area in the light-absorbing material. The particular case depends on the interaction between the light-absorbing material and the aperture-forming illumination, e.g., the interaction can constitute ablation or a photo-chemical reaction. Since light from the directional backlight is nearly collimated (i.e. collimated light 56), the light beams collected by each microlens 58 of microlens array 54 are focused on the diffusing member 16a. The light-absorbing material may be located with respect to the microlens array so that the size of each aperture is minimized while at the same time allowing the screen to produce an acceptable image. Since a majority of the surface of display cover plate 16 in the foregoing example comprises an absorbing layer, visual glare can be significantly reduced.

In accordance with the foregoing example, the light distribution through diffusing member 16a comprises an array of spots having a size given by the following equation, $$r = f \cdot \theta. \quad (2)$$

where r is the radius of each spot and f is the focal length of microlens array 54.

In the case where only two bezel portions need concealment, such as bezel portions 14a and 14b, a unidirectional backlight can be used. However, to avoid image blurring, the diffusing member should be such that light is diffused in the horizontal direction only. Such diffusing members can be made, for example, by holographic methods and replicated at low cost on plastic sheet. Additionally, since the light is only directional along the X-axis, the microlens array 54 of a diffusing member comprising a light absorbing layer, such as the diffusing member 16a of FIG. 10, must be replaced by an array of cylindrical lenses. Diffusing member 16a is then formed to have transparent slit apertures instead of an array of transparent circular apertures.

Figure 11:
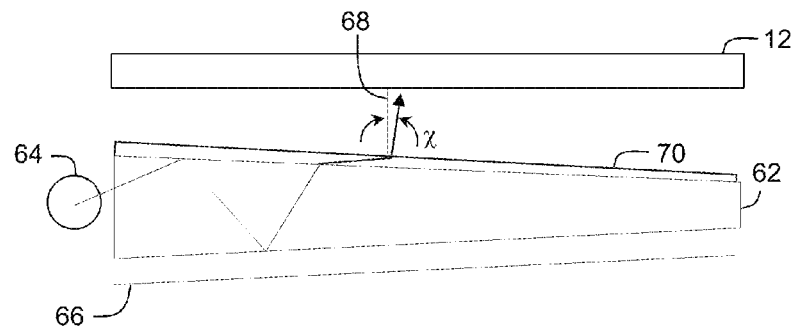
FIG. 11 is a cross sectional view of a directional backlight including a light guide plate.
Figure 12:
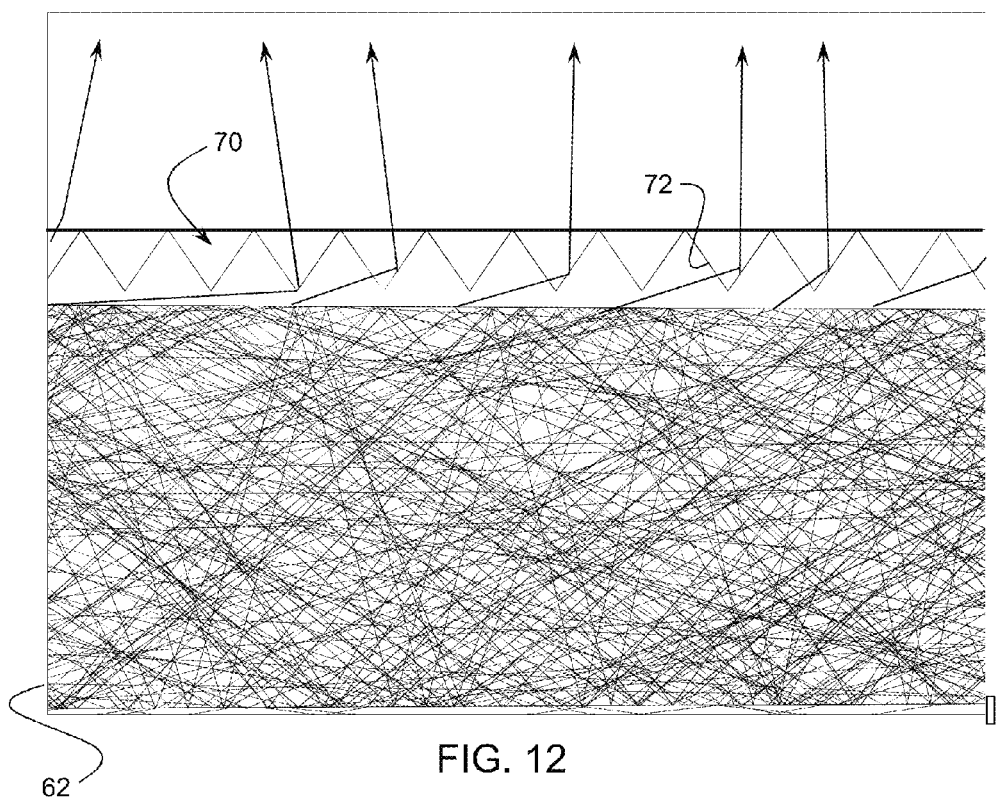
FIG. 12 is a cross sectional view of a portion of the light guide plate and a turning film.

Current trends in high quality backlighting of LCD display panels consist of using side lighting designs as depicted in FIG. 11, wherein light guide plate 62 is a wedge shaped plate illuminated from the edge by light source 64. For example, light source 64 can be a plurality of light emitting diodes. Alternatively, light source 64 may be a cold cathode fluorescent light. To extract light from light guide plate 62, the light guide plate is positioned at a predetermined angle relative to display panel 12. Alternatively, the light guide plate may include an array of prisms with a very shallow angle relative to the display panel. Light propagates into light guide plate 62 and, after many reflections, is at least partially extracted from the light guide plate. Although only a single ray of light is illustrated, multiple rays of light enter light guide plate 62 at multiple angles, and therefore light is leaking from the light guide plate along the length of the light guide plate relative to light source 64. A reflector 66 may be positioned behind light guide plate 62 relative to the observer to capture and reflect light that may leak from a back side of light guide plate 62. When simulating this type of structure through non-sequential ray tracing one finds that light leaks at a very high angle χ, in the range from about 80° to 90°. Here, dashed line 68 represents a normal to the plane of display panel 12, and χ is the half angle divergence of the light emitted by light guide plate 62. As shown in FIG. 11, an additional film, such as turning film 70, may be used to refract the light closer to a normal incidence As shown in FIG. 12, a turning film consists of an array of prisms 72 arranged such that one face of each prism provides for total internal reflection of the incident light to bend the light. One example of a suitable turning film is a Vikuiti™ turning film (i.e. TRAF II) manufactured by the 3M Company. FIG. 12 illustrates a large plurality of light rays propagating within light guide plate 62. Turning film 70 shifts the light direction or rays that would ordinarily be at a grazing incidence in the absence of the turning film, to a substantially normal incidence with a relatively narrow emission half angle χ (e.g. 5°), depending on the angle of light guide plate 62. In some examples, a combination of turning films can be employed, wherein the turning films are "pointed" in different directions.

In conventional LCD displays, the light emitted by backlight 44 is typically desired to be as close as possible to a Lambertian emitter so that the image can be seen at a large viewing angle without a significant decrease in intensity. Consequently, typical backlights include a backlight diffuser 74 that functions to spread the light within a wider angle in both X and Z directions. By removing backlight diffuser 74 from a conventional backlight a unidirectional backlight can be readily formed.

Figure 13:
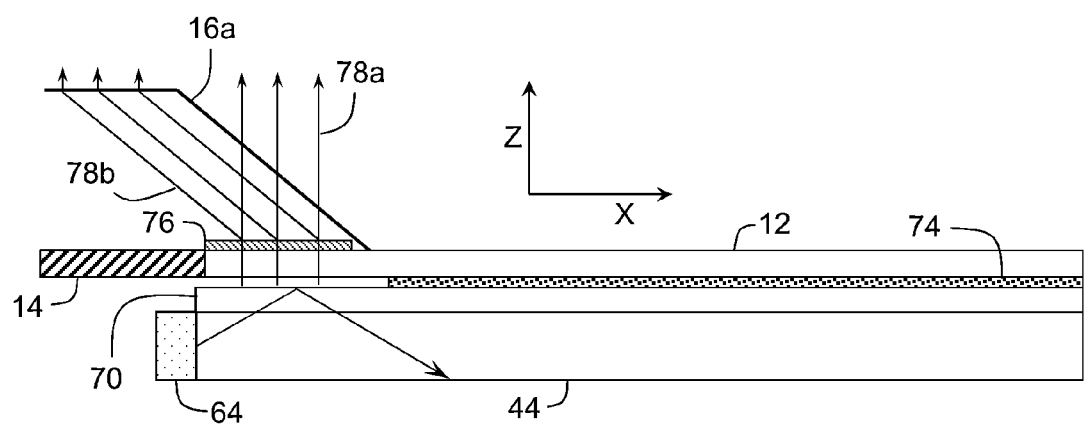
FIG. 13 is a cross sectional view of a portion of a display device wherein a diffusing member is used in conjunction with a backlight, wherein a portion of a diffusing screen is removed from the backlight to produce directionality of the emitted light.

FIG. 13 depicts the architecture of a system where backlight 44 approximates a Lambertian diffuser over most of display panel 12 except that close to the edge of the display panel at least a portion of backlight diffuser 74 (a diffusion film, for example) has been removed so that light from backlight 44 close to the edge of the display panel is highly directional in the Z-direction perpendicular to a plane of the display panel.

At the edge of the image, where backlight 44 is made directional by removing at least a portion of backlight diffuser 74, a splitting film 76 is inserted comprising a series of micro prisms used in a total internal reflection mode and having a 50% duty factor. That is, approximately 50% of the light (reference numeral 78a) passes directly through the film, and 50% of the light (reference numeral 78b) is refracted (turned) by the film at a large angle. Diffusing member 16a is inserted in the light path to scatter the light, thereby creating an image that can be seen over a wide viewing angle.

Figure 14:
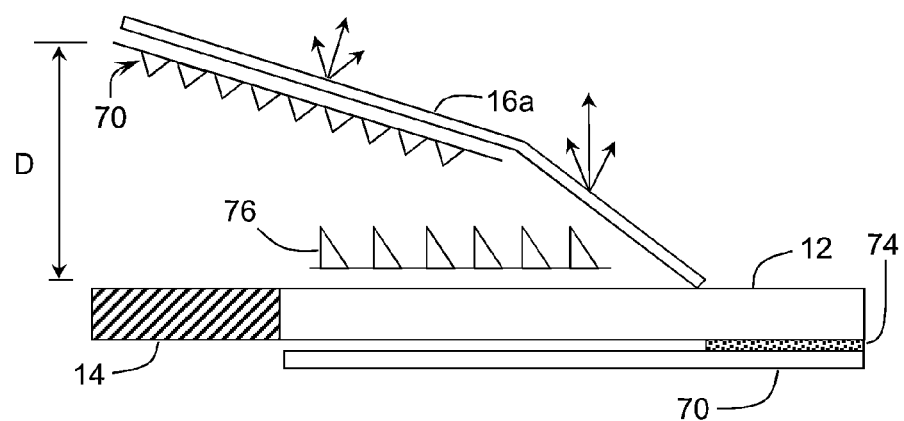
FIG. 14 is a close up view of an edge portion of display device of FIG. 13, wherein a turning film is deployed on the diffusing member.

Once the light has been split by splitting film 76, it is necessary to "unbend" and scatter the light (see FIG. 14). Modeling has shown that using the diffusing principals described supra, air gap D can be equal to or less than the bezel width, and in some examples equal to or less than about 0.7 times the bezel width. In accordance with the foregoing embodiments, diffusive elements may be formed over display cover plate 16, to form diffusing member 16a, for example as a diffusive film (i.e. layer) formed by holographic film processes, or the diffusive elements may be formed internal to (below the surface of the display cover plate 16.

Figure 15:
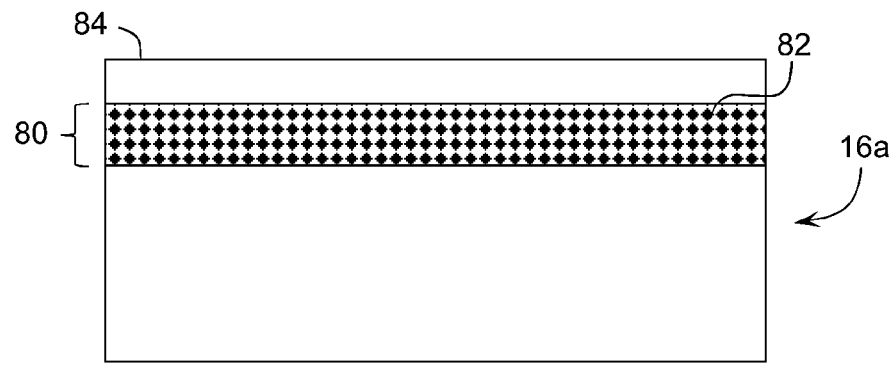
FIG. 15 is a cross sectional view of a portion of the diffusing member, wherein diffusing elements (e.g. particles) are dispersed within a diffusing layer within the diffusing member.
Figure 16:
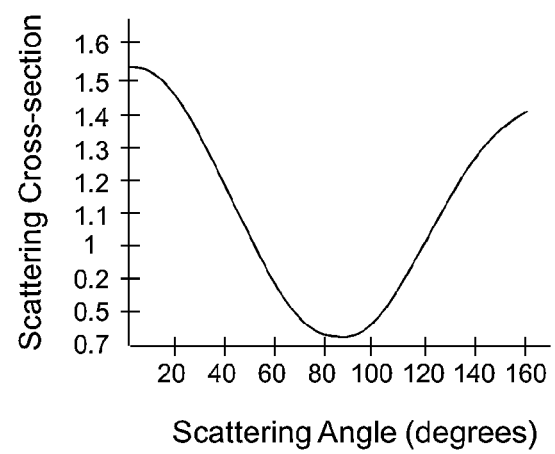
FIG. 16 is a graph of normalized scattering cross section as a function of scattering angle for a particle size of about 25 μm.
Figure 17:
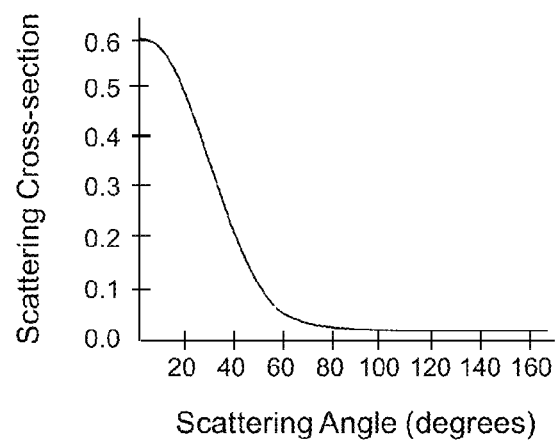
FIG. 17 is a graph of normalized scattering cross section as a function of scattering angle for a particle size of about 200 μm.
Figure 18:
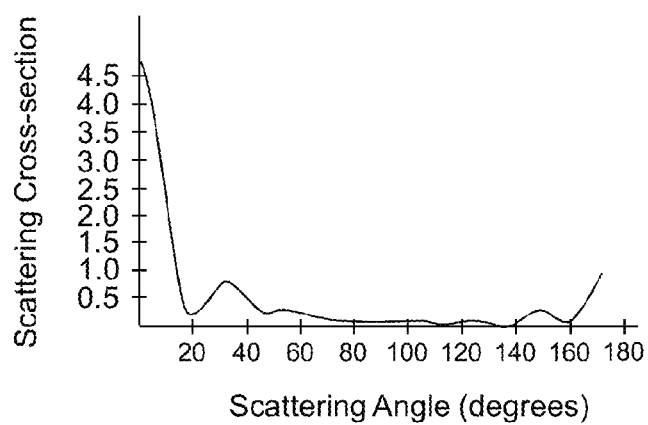
FIG. 18 is a graph of normalized scattering cross section as a function of scattering angle for a particle size of about 500 μm.

As illustrated in FIG. 15, volumetric scattering region 80 can be formed using high refractive index scattering elements 82 (e.g. particles) positioned below the display cover plate surface 84. FIGS. 16-18 illustrate the effect of scattering element size on the magnitude of scattering and show normalized scattering cross section as a function of angle. As indicated by FIG. 16, scattering elements on the order of 25 nm in diameter provide too much backscatter. The curve of FIG. 16 shows a high forward scattering intensity (i.e. at angle 0°), but also a high magnitude of scattering at an angle of 180°, indicating high backscatter. On the other hand, FIG. 17 shows that scattering elements 82 on the order of 200 nm in diameter provide primarily forward scattering over a reasonably broad angular distribution (e.g. 0°-45°). Finally, FIG. 18 illustrates a dominant forward scattering peak with a relatively narrow forward scattering angle for scattering elements 82 having diameter of about 500 nm (e.g. less than about 20°). Accordingly, in examples of the present disclosure, a mean particle size of the scattering elements is in a range from about 100 nm to about 300 nm, and in other examples in a range from about 150 nm to about 250 nm.

It will be apparent to those skilled in the art that various modifications and variations can be made without departing from the spirit and scope of the claimed invention.

What is claimed is:

1. A display device comprising:
   a directional backlight;
   a diffusing member;
   a display panel positioned between the directional backlight and the diffusing member, the display panel configured to display an image;
   a bezel disposed about the display panel;
   a diverging Fresnel lens array positioned between the display panel and the diffusing member; and
   a converging Fresnel lens array positioned between the display panel and the diffusing member;
   wherein a half angle divergence of light emitted by the directional backlight does not exceed 15° relative to a normal to a plane of the display panel.

2. The display device according to claim 1, wherein the diffusing member comprises a display cover plate.

3. The display device according to claim 2, wherein the display cover plate comprises glass.

4. The display device according to claim 3, wherein the glass is a chemically strengthened glass.

5. The display device according to claim 2, wherein the display cover plate comprises a light absorbing layer comprising an array of transparent regions.

6. The display device according to claim 5, wherein the directional backlight comprises a diffusing screen, and wherein the diffusing screen does not extend opposite edge portions of the display panel.

7. The display device according to claim 6, wherein a splitting film is positioned over the edge portions of the display panel.

8. The display device according to claim 1, wherein the diffusing member comprises diffusive particles distributed within a substrate.

9. The display device according to claim 8, wherein a mean particle size of the diffusive particles is between 100 and 300 nm.

10. The display device according to claim 8, wherein a mean particle size of the diffusive particles is between 150 and 250 nm.

11. A display device comprising:
    a directional backlight;
    a diffusing member comprising a substrate, an array of lenses, a layer of light absorbing material disposed on the substrate, and a plurality of apertures formed in the light absorbing material; and a display panel positioned between the directional backlight and the diffusing member, the display panel configured to display an image;

wherein the plurality of lenses of the diffusing member are positioned between the substrate of the diffusing member and the display panel.

12. The display device of claim 11, wherein the plurality of lenses are a plurality of microlenses and the plurality of apertures are a plurality of circular apertures.

13. The display device of claim 11, wherein the plurality of lenses are a plurality of cylindrical lenses and the plurality of apertures are a plurality of slit apertures.

14. The display device of claim 11, wherein the light absorbing material of the diffusing member is positioned between the substrate of the diffusing member and the display panel.

15. The display device of claim 11, wherein the light absorbing material is disposed on a majority of a surface of the substrate.

16. A display device comprising:
a directional backlight;
a diffusing member;
a display panel positioned between the directional backlight and the diffusing member, the display panel configured to display an image;
a backlight diffuser positioned between a central portion of the directional backlight and a central portion of the display panel; and
a splitting film positioned between an edge portion of the display panel and the diffusing member.

17. The display device of claim 16, further comprising a turning film positioned between the directional backlight and the backlight diffuser.

18. The display device of claim 16, wherein a distance between the diffusing member and the display panel increases toward the edge of the display panel.

* * * * *

UNITED STATES PATENT AND TRADEMARK OFFICE
CERTIFICATE OF CORRECTION

PATENT NO. : 8,950,883 B2  
APPLICATION NO. : 13/787194  
DATED : February 10, 2015  
INVENTOR(S) : Michael Etienne et al.

Page 1 of 1

It is certified that error appears in the above-identified patent and that said Letters Patent is hereby corrected as shown below:

On the title page  *Description*

Item 72  Inventor Michael Entienne, Corning, NY (US);  
should be Michael Etienne, Corning, NY (US);

Signed and Sealed this  
Seventh Day of June, 2016

Michelle K. Lee  
*Director of the United States Patent and Trademark Office*